US007506172B2

(12) United States Patent
Bhakta

(10) Patent No.: US 7,506,172 B2
(45) Date of Patent: Mar. 17, 2009

(54) GAMING DEVICE WITH BIOMETRIC SYSTEM

(75) Inventor: Rakesh Bhakta, Henderson, NV (US)

(73) Assignee: IGT, Reno, NV (US)

(*) Notice: Subject to any disclaimer, the term of this patent is extended or adjusted under 35 U.S.C. 154(b) by 511 days.

(21) Appl. No.: 10/040,603

(22) Filed: Jan. 7, 2002

(65) Prior Publication Data

US 2003/0131265 A1 Jul. 10, 2003

(51) Int. Cl.
*H04K 1/00* (2006.01)
*A63F 13/00* (2006.01)

(52) U.S. Cl. .......................................... 713/186; 463/29

(58) Field of Classification Search .................. 713/186
See application file for complete search history.

(56) References Cited

U.S. PATENT DOCUMENTS 5,229,764 A 7/1993 Matchett et al.
5,429,361 A 7/1995 Raven et al.
5,473,144 A * 12/1995 Mathurin, Jr. ............... 235/380
5,586,936 A 12/1996 Bennett et al.
5,795,228 A 8/1998 Trumbull et al.
5,839,956 A * 11/1998 Takemoto .................... 463/25
5,869,822 A 2/1999 Meadows et al.
5,879,453 A 3/1999 Streeter et al.
6,010,404 A 1/2000 Walker et al.
6,110,041 A * 8/2000 Walker et al. ................. 463/20
6,149,062 A 11/2000 Danielson et al.
6,157,966 A 12/2000 Montgomery et al.
6,234,900 B1 * 5/2001 Cumbers ..................... 463/29
6,264,560 B1 7/2001 Goldbert et al.
6,307,956 B1 10/2001 Black
6,327,376 B1 12/2001 Harkin
6,363,485 B1 3/2002 Adams et al.
6,496,595 B1 * 12/2002 Puchek et al. ............... 382/124
6,527,638 B1 3/2003 Walker et al.
6,554,705 B1 * 4/2003 Cumbers ..................... 463/29
6,572,014 B1 * 6/2003 Lambert ..................... 235/380
6,612,928 B1 9/2003 Bradford et al.

(Continued)

FOREIGN PATENT DOCUMENTS

AU 78829/94 B 2/1995

(Continued)

OTHER PUBLICATIONS

D Corcoran, D Sims, B Hillhouse, Smart Cards and Biometrics: The cool way to make secure transactions, Mar. 1999, ACM Linux Journal.*

(Continued)

*Primary Examiner*—Brandon S Hoffman
(74) *Attorney, Agent, or Firm*—George H. Gerstman; Seyfarth Shaw LLPO

(57) ABSTRACT

A method of gaming comprises the steps of:

acquiring first biometric data of a game player by observing the game player through a button of the gaming machine when touched by the game player, in which the button also serves in operation of the gaming of the gaming machine. The first biometric data is compared with second biometric data provided by another source, for example, a "smart card" carried by the game player. Then, the gaming machine is activated for play by the game player if the first and second biometric data have a close similarity.

9 Claims, 1 Drawing Sheet

U.S. PATENT DOCUMENTS

| | | | | |
|---|---|---|---|---|
| 6,629,591 | B1 * | 10/2003 | Griswold et al. | 194/205 |
| 6,743,098 | B2 * | 6/2004 | Urie et al. | 463/29 |
| 6,846,238 | B2 * | 1/2005 | Wells | 463/39 |
| 7,286,691 | B1 * | 10/2007 | Modl et al. | 382/115 |
| 2001/0011680 | A1 | 8/2001 | Soltesz et al. | |
| 2002/0021001 | A1 * | 2/2002 | Stratford et al. | 283/74 |
| 2002/0034321 | A1 * | 3/2002 | Saito et al. | 382/124 |
| 2004/0035926 | A1 | 2/2004 | Orus et al. | |

FOREIGN PATENT DOCUMENTS

| | | | |
|---|---|---|---|
| DE | 199 44 140 | A1 | 3/2001 |
| EP | 1 120 757 | A2 | 8/2001 |
| WO | WO 91/06920 | | 5/1991 |
| WO | 9410658 | | 5/1994 |
| WO | 9416416 | | 7/1994 |
| WO | WO 94/16416 | | 7/1994 |
| WO | WO 00/58858 | | 10/2000 |

OTHER PUBLICATIONS

Afzel Noore, Highly Robust Biometric Smart Card Design, Jul. 2000, IEEE.*

W Aiello, A Rubin, M Strauss, Using smartcards to secure a personalized gambling device, Nov. 1999, At&t Labs, 6th ACM conference on Computer and communications security.*

"The KSI fingerprint sensor, KC-901 Evaluation Kit"; Kinetic Sciences Inc.; Sep. 5, 2001 (3 pages).

Kinetic Sciences Inc. Fingerprint Biometrics Division; Kinetic Sciences Fingerprint Biometric Home Page; Sep. 5, 2001 (1 page).

Biometrics-Key Text "Putting a finger on it—the loops and whorls of"; Australian Academy of ScienceNov. 20, 2001 (4 pages).

U.S. Appl. No. 09/491,899, filed Jan. 27, 2000 "Gaming Terminal and System with Biometric Identification".

European Search Report (dated Apr. 12, 2007).

* cited by examiner

GAMING DEVICE WITH BIOMETRIC SYSTEM

BACKGROUND OF THE INVENTION

As described in the current pending U.S. patent application of William R. Wells, et. al., Ser. No. 09/491,899, gaming devices as described therein comprise systems for preventing, reducing, or detecting unauthorized card usage in cashless gaming, resulting for example from stolen or lost cards. As described therein, biometric sensing of the game player can provide a comparison of the biometric data directly received from the game player with biometric data carried on a cashless gaming card, with access to the gaming machine being typically permitted only when there is a match of the data.

Biometric measurement devices are available for use in connection with automatic teller machines, personal computers, and the like. Such biometric systems include retinal, iris, or fingerprint scans, as well as voice print or voice recognition systems, facial recognition systems, and the like. Preferably, the biometric identification system does not involve a remote access database. Rather, the biometric data which is directly measured from the game player is compared with biometric data on the cashless gaming card that the player carries, for both privacy of the data, and also to avoid the delay which may result from complex electronic transmissions to and from a central system which stores data and compares it.

By this invention, obtaining of biometric data from the game player is simplified and rendered rather automatic, avoiding a separate step that is perceptible to the game player, and slowing the game down from his perspective, or, perhaps generating a feeling of insecurity as the acquisition of biometric data is demanded and then taken by a separate biometric sensing device.

DESCRIPTION OF THE INVENTION

By this invention, a gaming device is provided, which comprises:

a gaming terminal, configured for playing at least a first game; a button for pressing by a game player as a part of said game; and a biometric device for measuring biometric data of the game player by sensing said biometric data through said button as it pressed by the game player, using any appropriate biometric data acquisition system, some of which are mentioned above.

Accordingly, the biometric data desired for identification of the game player may be sensed as the player attempts to initiate the game by pressing a button, which button also actuates another function of the gaming device, such as initiation of the game. While it would be expected that a small sign or some other means would be used to notify the game player that biometric data is being taken, the player does not have to think about that fact. It happens automatically as he or she presses a button to initiate the game, or, optionally, to exercise another function in the game by pressing of the button. It should be understood that the term “button” can also include a horizontal switch or any other actuating member, whether actually moveable or not, that actuates a function of the game while simultaneously taking the desired biometric scan.

The biometric scan may be physically associated with the button. The biometric data may be sensed through the button, meaning that the actuation of the button for a particular game function also actuates the biometric device, even if it is physically separated from the button. For example, a separate facial scan device could be actuated as the player initiates the game by touching of a button. Preferably, light actually passes through the button for sensing by the biometric device.

Other buttons that might be used in conjunction with the biometric scanner are the cashout button, a max bet button, a hold button, a deal-draw button, a change button, and the like. Preferably, the button used is the game starting button.

Typically, a fingerprint of the game player may be sensed through the button as the biometric data. Specifically, the button may be transparent, to provide optical access to a known fingerprint sensing device of the finger as the button is touched. Known fingerprint sensing devices are commercially available. For example, some are sold by Fujitsu, as well as other suppliers.

Others known fingerprint sensing devices use capacitive scanning, having an array of tiny capacitors mounted on a silicon chip. The fingerprint ridges can be detected with this system. Also, ultrasound fingerprint scanners may be used. In these circumstances the button may be optically opaque.

The gaming terminal may also carry a comparator for comparing the parameters of the game player’s fingerprint or other biometric data with parameters obtained from another, typically electronically stored source. Player identification can be successfully made when the two compared parameters comprise a match.

Typically, the “other, typically electronically stored source” described in the previous paragraph may comprise data received from a data storage device carried by the game player, for example, a “smart card” comprising a microprocessor. However, a variety of other devices and cards can be used to provide the desired stored biometric data against which the biometric data taken directly from the would-be player can be compared. Besides smart cards or other cards, various other kinds of tokens may be used, for example, a necklace, an article of clothing such as a hat, bracelet, or a wristwatch, which carries appropriate electronic storing and transmission circuitry so that the stored biometric data may be transferred to the gaming device, for comparison with the biometric data directly picked up from the would-be player.

Upon the detection of a “match,” the gaming machine is typically opened for cashless gaming, dependent upon the financial resources of the player, which may be monitored during the process by the data transferred to and from the smart card or equivalent device.

Additionally, a device may be present in the gaming device for storing the measured biometric data of the game player for later access. This could be used in the event that the biometric data does not match. It may be that a credit card thief has left his personal, biometric data behind in an attempt to capitalize on the stolen card, which data can be extremely valuable in subsequent apprehension and prosecution. Particularly, for privacy concerns, the biometric data which does match may not be stored, while the biometric data which fails to match would be stored, so that for the bonafide customers of the casino, they could expect that their biometric data is not retained by the casino, but is stored only on their card or other token used to activate the machines, and to compare stored biometric data with actual data picked up from the player.

Also, by this invention, a gaming method comprises the steps of:

acquiring first biometric data of a game player by observing the data through a button of a gaming machine when touched by the game player; comparing the biometric data with second biometric data provided by another source; and activating the gaming machine for play by the game player if the first and second biometric data have close similarity.

The specific degree of close similarity (previously called “a match”) would be as determined by a comparison program. It is to be expected that some differences between the first and second biometric data may be noted, but may be insignificant in light of the overall close similarity.

For example, each of the first and second biometric data may comprise parameter of a fingerprint. If the parameters substantially match, access to the gaming machine is opened.

Typically, the second biometric data is obtained from a data storage device carried by the game player, although, if desired, it could be stored in a central data base at the casino or elsewhere. As stated before, the data storage device can be a "smart card" comprising a microprocessor or equivalent device, not necessarily of card shape but, rather, comprising some other personal article that is preferably easily carried by the game player, as previously mentioned.

Also as previously mentioned, the biometric data, such as parameters of a fingerprint, may be optically obtained through the button of the gaming machine, particularly a button which is used in the game for activation or some other function of the gaming machine. Thus, the biometric scan is significantly de-emphasized, while it still takes place. This may contribute to the comfort of many of the players. Alternatively, the actuation of one of the gaming buttons can actuate a separate biometric sensor so that the observation of the data is still indirectly "through a button of the gaming machine" but without the direct utilization of the button itself in the acquisition of the biometric data.

The same card or other device that carries the stored biometric data may also carry financial data of the player, providing limits and controls for the cashless gaming activities, and also serving as a repository of electronic cash if desired, for both transferring cash to a casino for playing, and receiving winnings in the form of cash, if desired. Also, the card or other device may carry other data with respect to the user, for example, data on the user's preferences and the like, so that special options, offers, and treatment may be provided in an electronic manner for the game player.

The biometric storage device used may be substantially in a standard format such as in a "smart card" format or the like, so that the safeguards afforded by biometric systems can be used while allowing the player to retain possession and control of the biometric data, and avoiding costs and delays associated with central or remote storage of biometric reference data.

DESCRIPTION OF SPECIFIC EMBODIMENTS

Figure 1:
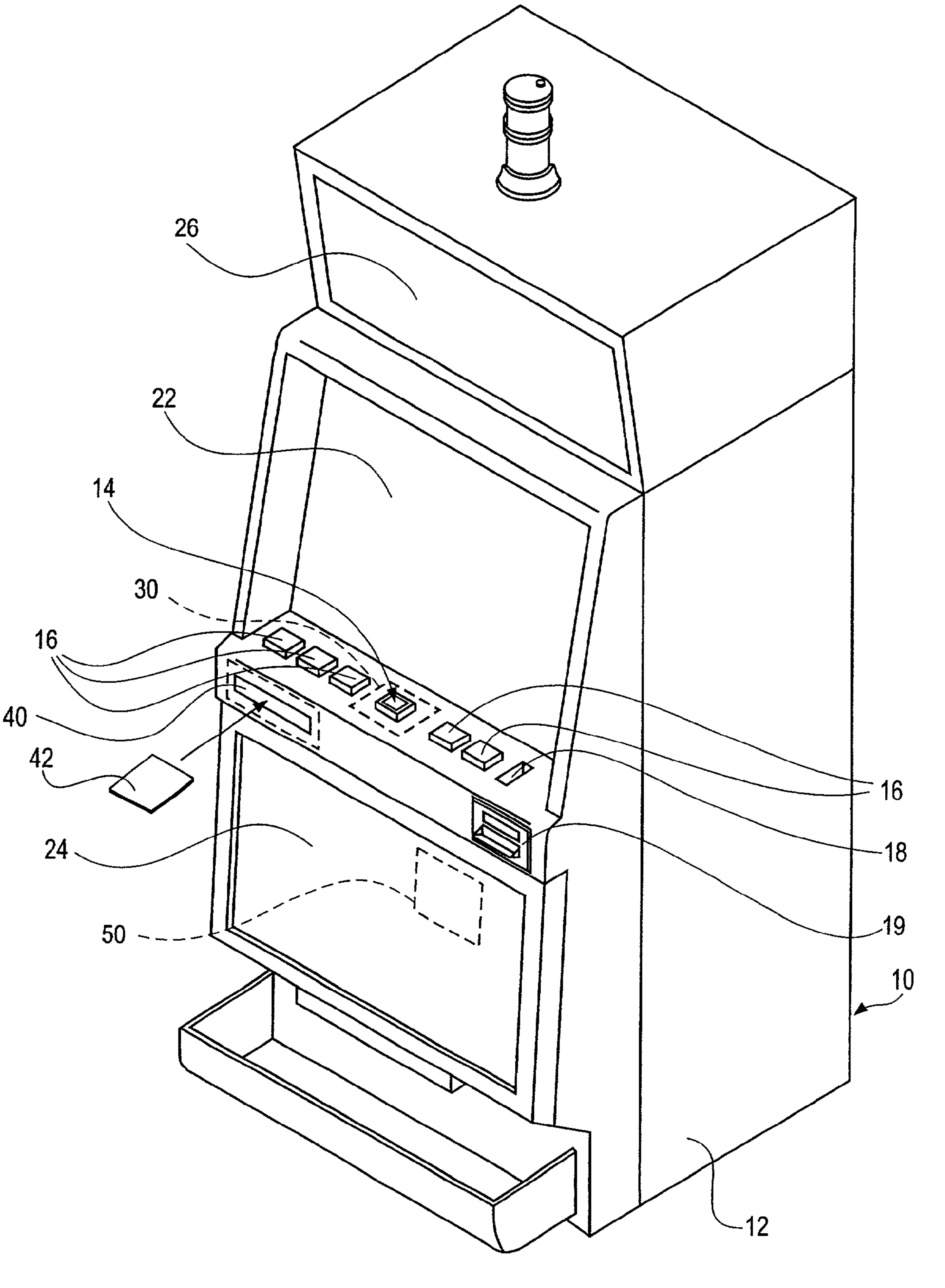
FIG. 1 is a perspective view of a gaming device according to an embodiment of the present invention.

Referring to FIG. 1, a gaming terminal can comprise a housing 12, control buttons 14, 16, a coin slot 18, a bill acceptor 19, a CRT, liquid crystal, or other computer display 22, and regions, 24, 26 for providing other desired components such as signage, instructions, attract displays, progressive game displays and the like.

In accordance with this invention, a fingerprint sensor 30 is mounted within housing 12, adjacent to button 14, which may comprise the game start button. Button 14 may be optically transparent, so that the fingerprint sensor 30 can optically detect a finger which touches button 14. Thus, as the game user comes to the gaming machine 10 and tries to actuate the machine by touching button 14, fingerprint sensor 30 can be activated by the button 14 to scan the fingerprint of the user, to measure the parameters of the fingerprint.

Gaming device 10 also carries a card reader 40, for the insertion of a smart card 42 or for the reading of a card utilizing wireless data transmission. Included in the data which is transmitted from the card 42 to reader 40, and to comparator and memory storage device 50, are biometric data carried on the card, specifically in this instance, the parameters of a prior fingerprint scan of a person to whom the card belongs. Accordingly, to play the machine, the user inserts his card into card reader 40 and touches button 14 to actuate the machine. As he touches button 14, fingerprint sensor 30 senses the fingerprint and converts it electronically into fingerprint parameters which are electronically sent to comparator 50. Card reader 40 also transfers the fingerprint parameters carried by the card to comparator 50, where the two sets of parameters are compared.

In the event that the two sets of parameters define a "match" in accordance with the dictates of the analysis programming used, the machine is activated for play. Data pertaining to the cash or credit balance possessed by the player may also be transferred from the card to the card reader 40, which may also be transferred to software and a microprocessor in machine 10 for continuing recalculation of the players' balance and transmission of data back to the card 42, or to a central computer in the casino, or to another financial agency at which the game player has an account.

If a match between the two sets of data is not achieved, the pressing of button 14 does not activate the machine. Furthermore, a signal may be sent to a central security location indicating the failure of the match, and the data sensed by fingerprint sensor 30 may be stored in the comparator and storage unit 50 for security and law enforcement purposes. The data of card 42 may also be stored in that circumstance. Particular storage techniques may be one of any of a variety of conventional techniques for electronic storage.

Other data that may be utilized from card 42 and, if desired, stored, may include account balance information, the name, identity number or frequent player number of the player, or other personal identifier numbers, hotel identification and/or room number. The smart card 42 may also be used for storing user preference information such as indications of types of games, drinks, entertainment and the like, preferred food, smoking/non-smoking preferences, preferred machine denominations and types, and the like, for use electronically to automatically personalize the gaming experience for the user.

Further details on the use of biometric data with a smart card are as indicated in the previously cited patent application Ser. No. 09/491,899.

In some embodiments, successful matching of the biometric data not only opens the machine for playing, but access to the player's account is opened, for use of a credit or debit card balance, or another cash balance, for playing of the machine. In one embodiment, all of the players' wagers are charged to, and all of the players' prizes or winnings are credited to, a players' account. Accordingly, such a system permits effective and efficient gaming in a cashless system, i.e., without the use of coins, tokens, or currency.

Such a cashless system can result in a significant reduction in the size, cost, and weight of gaming terminals, while also greatly reducing the need for cash collection maintenance of such terminals. Therefore, coin slot 18 and bill collector 19, as shown, are optional.

Thus, the present invention provides an easy to use and highly secure system for implementing gaming without the need for coins, tokens, currency or the like, where the actual process of the security system is significantly downplayed by being mixed into the playing of the machine, and not being a separate act apart from playing of the machine. Also, individuals may retain exclusive possession and control of their biometric data, particularly when the situation is proceeding normally, with a data "match" being achieved and there being no evidence of misdeed. Such smaller, inexpensive gaming machines may find added use in new or emerging gaming markets such as hotel in-room gaming, small-footprint casino gaming, transportation-based gaming such as automobile or aircraft, cruise ship or other shipboard gaming terminals of relatively compact, lightweight nature, wall-mounted and/or thin-profile gaming terminals, wireless gaming terminals, multi-terminal gaming systems, and/or gaming systems for small or portable computing devices such as laptop computers and the like. Internet-coupled computers may also be utilized in accordance with this invention including in-home computers, television-based systems, television cable systems and the like.

Also, as shown in FIG. 1, a biometric measurement device may be used in accordance with this invention in a gaming machine where cash is used.

While this present invention has been described in the context of the gaming industry, there is no reason why the present invention cannot also be used in other contexts, such as the banking industry, or the purchase of goods or services at retail locations, through the Internet or other electronic commerce channels and the like, where an activation button of the particular banking or purchase function automatically results in a biometric scan, particularly directly through the button itself. Further security may be provided by a system which also requires the player to insert a personal identification number (PIN), a password, or similar code into the computer.

It is also possible for the biometric identification system to be used only under certain conditions, such as when the total of wagers for a player or a given time period or at a given terminal is less than a threshold amount or greater than a threshold amount, or upon report of a lost card, or the like.

Also the system of this invention could be configured so that with a relatively low amount of total wagers, a low-security verification of a fingerprint scan vs. data stored on the player's card could be used, but when the player wishes to make wagers greater than a certain threshold, a more rigorous identification system, such as a comparison of retina scans, iris scans, or more detailed fingerprint scan information or the like could be performed, possibly making use of information found at a central location. This might take place if any questions arise because of the initial biometric data screen.

Also, if the user has a card without biometric data, the user's biometric data may be directly measured and stored in memory storage unit 50 upon the first playing of gaming machine 10. This storage might alternatively or also be placed on the card, or at a central location. Thereafter, any subsequent use of the card may involve the recognition that the card has biometric data stored thereon, which may be read for comparison with direct biometric data provided through button 14 and sensor 30.

Smart cards, credit cards, debit cards or the like used in connection with this invention may be issued by financial institutions such as banks, credit card companies, tourism bureaus, airlines, ocean liner companies and the like. The particular cards may be good for use at one casino, a group of casinos, or any casino as the case may be. Cashless gaming terminals used may be stand-alone, not coupled to other gaming terminals, or they can be part of a network of gaming terminals such as those coupled to a casino cluster controller and/or for implementation of a multi-terminal prize system such as a progressive prize system.

Further, while the biometric data has been discussed above as being stored electronically, it is possible to use other machine-readable methods of storing biometric data such as digital optical storage and the like.

In those circumstances where the user registers prior to the game with the casino or elsewhere prior to the gaming, a user may pre-register using a process similar to player-racking registration, but also including biometric (for example, fingerprint) registration. If desired, pre-registration can include establishing a credit or debit account, e.g., for use in connection with cashless gaming terminals. Also, registration can occur directly at gaming terminal locations, for example, for players who wish to have the convenience of using a debit card, but only for his or her present day winnings. In this scenario, a gaming terminal may be configured with a bill validator, a smart card reader and a biometric sensor as indicated in FIG. 1. In response to receipt of currency using the bill acceptor, the device may dispense a programmable smart card. The player will be prompted to insert the smart card in the card reader 40 and will place his or her finger on the button 14 for fingerprint sensing. Sensor 30, generally with the assistance of other software, will register and verify the fingerprint data, and then record in memory (preferably in encrypted form) the fingerprint data, also crediting the currency amount on the smart card and sending at least the credit data via the casino or other network to a central computer system. When the player leaves, the player can go to a casino cashier or kiosk for cashing out any remaining credit left on the card 42.

In another scenario, a smart card is not needed. All transactions including the biometric scan will be maintained on the casino computer system with biometric sensors being used for authentication. In this scenario, the casino (or other) computer system will be operational for the transactions to occur, as opposed to a system using a smart card in which the card is used to provide the media for the transaction.

The above has been offered for illustrative purposes only, and is not intended to limit the scope of the invention of his application, which is as defined in the claims below.

What is claimed is:

1. A gaming device comprising:

a gaming terminal, configured for playing at least a first game;

a data storage device for carrying by a game player;

said data storage device containing biometric data of the game player;

a reader for receiving data from said data storage device carried by a game player;

a button for pressing by a game player as a part of said game;

a biometric device for measuring biometric data of the game player by sensing said biometric data directly through said button as it is pressed by the game player;

said terminal carrying a comparator for comparing the parameters of the game player's biometric data sensed through the button with biometric data parameters directly obtained from said data storage device carried by the game player, without involving a remote access database in the comparison, for player identification.

2. The gaming device of claim 1, in which said data storage device is a smart card, comprising a microprocessor.

3. A gaming device of claim 1 in which said biometric data is the game player's fingerprint.

4. A gaming method comprising:

providing a gaming terminal, configured for playing at least a first game;

providing a data storage device for carrying by a game player;

said data storage device containing biometric data of the game player;

receiving data from said data storage device carried by a game player;

pressing a button by a game player as part of the game;

measuring biometric data of the game player by sensing the biometric data directly through the button as it is pressed by the game player;

comparing the parameters of the game player's biometric data sensed through the button with biometric data parameters directly obtained from the data storage device carried by the game player, without involving a remote access database in the comparison, for player identification.

5. The gaming method of claim 4, in which the data storage device is a smart card, comprising a microprocessor.

6. The gaming method of claim 4, in which the biometric data is the game player's fingerprint.

7. The gaming method of claim 4, including the step of storing the measured biometric data of the game player in the event that the player's biometric data sensed through the button does not match the biometric data parameters directly obtained from the data storage device carried by the game player.

8. The gaming method of claim 7, including the step of not storing the biometric data of the game player if the game player's biometric data sensed through the button matches the biometric data parameters directly obtained from the data storage device.

9. A gaming method comprising:

providing a gaming terminal, configured for playing at least a first game;

providing a data storage device for carrying by a game player;

said data storage device containing biometric data of the game player;

receiving data from said data storage device carried by a game player;

pressing a button by a game player as part of the game;

measuring biometric data of the game player by sensing the biometric data directly through the button as it is pressed by the game player;

comparing the parameters of the game player's biometric data sensed through the button with biometric data parameters directly obtained from the data storage device carried by the game player, without involving a remote access database in the comparison, for player identification;

storing the measured biometric data of the game player in the event that the player's biometric data sensed through the button does not match the biometric data parameters directly obtained from the data storage device carried by the game player; and not storing the biometric data of the game player if the game player's biometric data sensed through the button matches the biometric data parameters directly obtained from the data storage device.

* * * * *